(12) United States Patent
Takamori et al.

(10) Patent No.: US 7,397,755 B2
(45) Date of Patent: *Jul. 8, 2008

(54) OPTICAL INFORMATION RECORDING MEDIUM

(75) Inventors: Nobuyuki Takamori, Kitakatsuragi-gun (JP); Hideharu Tajima, Izumi (JP); Akira Takahashi, Nara (JP)

(73) Assignee: Sharp Kabushiki Kaisha, Osaka (JP)

( * ) Notice: Subject to any disclaimer, the term of this patent is extended or adjusted under 35 U.S.C. 154(b) by 574 days.

This patent is subject to a terminal disclaimer.

(21) Appl. No.: 10/506,867

(22) PCT Filed: Mar. 3, 2003

(86) PCT No.: PCT/JP03/02406

§ 371 (c)(1),
(2), (4) Date: Sep. 3, 2004

(87) PCT Pub. No.: WO03/075268

PCT Pub. Date: Sep. 12, 2003

(65) Prior Publication Data

US 2005/0117505 A1    Jun. 2, 2005

(30) Foreign Application Priority Data

Mar. 5, 2002   (JP) ............................. 2002-058997
Mar. 13, 2002  (JP) ............................. 2002-068705

(51) Int. Cl.
*G11B 7/24* (2006.01)
(52) U.S. Cl. .................... 369/275.1; 369/288; 428/64.4
(58) Field of Classification Search ... 369/275.1–275.5, 369/13.24, 288, 59.25, 110.01, 110.03, 44.34; 428/64.1–64.6
See application file for complete search history.

(56) References Cited

U.S. PATENT DOCUMENTS

| | | | | |
|---|---|---|---|---|
| 5,420,846 A | * | 5/1995 | Sugiyama et al. | 369/100 |
| 5,610,879 A | * | 3/1997 | Moriya et al. | 369/13.24 |
| 6,461,710 B1 | * | 10/2002 | Kikukawa et al. | 428/64.1 |
| 6,524,766 B1 | * | 2/2003 | Ariyoshi et al. | 430/270.13 |
| 6,961,300 B2 | * | 11/2005 | Cheong et al. | 369/275.1 |

FOREIGN PATENT DOCUMENTS

| | | |
|---|---|---|
| JP | 05-012673 | 1/1993 |
| JP | 05-012715 | 1/1993 |
| JP | 08-096412 | * 4/1996 |

(Continued)

OTHER PUBLICATIONS

T. Shintani, et al., "A New Super-Resolution Film Applicable to Read-Only and Rewritable Optical Disks," Jpn. J. Appl. Phys., vol. 38, 1999, pp. 1656-1660.

*Primary Examiner*—Ali Neyzari
(74) *Attorney, Agent, or Firm*—David G. Conlin; David A. Tucker; Edwards Angell Palmer & Dodge LLP

(57) ABSTRACT

An optical information recording medium characterized by comprising a temperature-sensitive layer formed on a substrate, for reversibly changing in reflectance and/or transmittance with a temperature change. A temperature-sensitive layer having the property of changing in reflectance with a temperature change is used, as well as the property of changing in light interference effect with a temperature change, thereby providing an optical information recording medium capable of providing a higher, more stable reproduction signal power.

13 Claims, 4 Drawing Sheets

FOREIGN PATENT DOCUMENTS

| | | |
|---|---|---|
| JP | 08-111035 | 4/1996 |
| JP | 08096412 * | 4/1996 |
| JP | 08-124217 | 5/1996 |
| JP | 2001-032935 | 2/2001 |
| JP | 2001-035011 | 2/2001 |
| JP | 2001-035012 | 2/2001 |
| JP | 2001-056961 | 2/2001 |
| JP | 2001-067727 | 3/2001 |
| JP | 2001-067731 | 3/2001 |
| JP | 2001-084643 | 3/2001 |
| JP | 2001-084645 | 3/2001 |
| JP | 2001-101707 | 4/2001 |
| JP | 2001-202657 | 7/2001 |
| JP | 2001-243657 | 9/2001 |
| JP | 2001-273679 | 10/2001 |
| JP | 2002-025057 | 1/2002 |
| JP | 2002-056573 | 2/2002 |
| JP | 2003-091875 | 3/2003 |

* cited by examiner

OPTICAL INFORMATION RECORDING MEDIUM

This application claims priority from International Application No. PCT/JP03/02406, filed Mar. 3, 2003.

TECHNICAL FIELD

The present invention relates to an optical information recording medium and a reproduction method thereof. More particularly, the present invention relates to an optical information recording medium such as an optical disc on which information is optically recorded/reproduced and to a reproduction method thereof.

BACKGROUND ART

With an advancement of digitalization in an information-oriented society, there is an increasing demand for a higher density recording/reproduction on a writable medium.

In order to increase a recording capacity in a so-called writable optical recording medium, various medium structures have been tried. Also, in order to realize a higher density recording/reproduction, various measures have been taken such as i) shortening the wavelength of a laser beam for recording and reproduction, ii) enlarging the NA (numerical aperture) of an object lens with which light is focused onto the optical information recording medium, iii) providing a plurality of recording layers to the optical information recording medium, and iv) forming a mask layer in the optical information recording medium for substantially reducing the diameter of a laser light spot.

For example, Japanese Unexamined Patent Publication Nos. HEI 5(1993)-12673, HEI 5(1993)-12715 and 2001-35012 have proposed the technique of forming a mask layer in the optical information recording medium for substantially reducing the diameter of a laser light spot.

According to this technique, in an optical information recording medium, the mask layer is formed at a location nearer to a side from which light is incident than a recording film. The mask layer is usually made of a thermochromic material or of a phase change material. Upon irradiation of the mask layer with a light beam for reading, a light spot is formed on the mask layer, and as the temperature rises at a central part in the light spot, the mask layer changes optically or thermally to partially have its color erased and to partially become light-transmissive so that the size of the light spot is substantially reduced, while with no incident light or with only weak incident light, the mask layer has a small transmittance. That is, the mask layer allows light to pass through only a part thereof where light intensity is high so that recording/reproduction of small pits is achieved. In other words, the diameter of a light spot can substantially be reduced and thereby a high density recording/reproduction on the optical information recording medium can be achieved.

By being heated above a predetermined temperature, the mask layer melts to exhibit a masking effect. In a melt state, the mask layer has a high flowability and has a composition and a shape changed from original ones. Therefore, repeated recording/reproduction on the optical information recording medium causes the change in the composition and the shape of the mask layer, and thereby a masking effect gradually diminishes, and after about several thousands of repeated recording/reproduction, the masking effect substantially vanishes.

Further, in the optical information recording medium, the mask layer formed at a side near to an incident light side absorbs not a small portion of the entire amount of light that otherwise reaches the recording layer. As a result, a reduction in recording sensitivity and a rise in reproduction noise are caused, whereby a high signal quality cannot be obtained.

Also, since the transmittance or reflectance of the mask layer is changed by a change in the composition of the mask layer or a dye reaction thereof, the transmittance or reflectance of the mask layer cannot be changed to a greater degree, even if the mask layer is heated so that its temperature is raised by 100° C., than a degree allowed by the physical properties of a substance used for the mask layer. Thus, there is a limitation on a signal quality obtained.

DISCLOSURE OF INVENTION

The present invention provides an optical information recording medium characterized in that a temperature-sensitive layer whose reflectance and/or transmittance reversibly change according to a change in a temperature of the temperature-sensitive layer is formed on a substrate.

With this constitution, the present invention can provide a reproduction signal having a higher intensity and stability by utilizing one characteristic of the temperature-sensitive layer of changing a refrangibility of light according to a change in a temperature of the temperature-sensitive layer or by utilizing, in combination of the above characteristic, another characteristic that its light interference effect changes according to a change in a temperature of the temperature-sensitive film.

The present invention also provides a reproduction method of an optical information recording medium characterized in that the method comprises the steps of: irradiating the medium as described in any one of claims 1 to 7 with a light beam to form a spot of the light beam on a temperature-sensitive layer so that a high-temperature region and a low-temperature region are generated; reversibly changing reflectance and/or transmittance on the high-temperature region and the low-temperature region of the temperature-sensitive layer; and reproducing information according to light reflected from a temperature region showing a higher reflectance.

This can ensure a high signal quality to allow for reproduction with high stability.

BEST MODE FOR CARRYING OUT THE INVENTION

Figure 1:
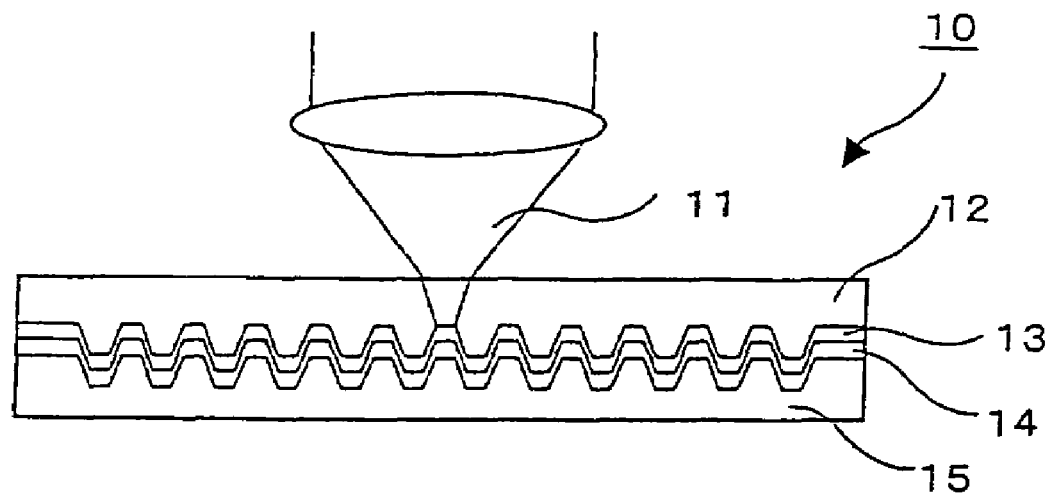
FIG. 1 is a schematic cross section of an essential part in one example of an optical information recording medium of the present invention.

The optical information recording medium of the present invention is made mainly of a substrate and a temperature-sensitive layer formed thereon.

Suitably, the substrate is usually one that does not prevent incidence of light and that is capable of providing an appropriate strength to the optical information recording medium. With such a substrate, a type of optical information recording medium where light is incident from a substrate side can be constituted. A material of the substrate is not specifically limited, and examples thereof include: glass; plastics such as polycarbonate, amorphous polyolefin, polyimide, PET, PEN and PES; and ultraviolet-curing type acrylic resins. Suitably, the substrate has usually a thickness of about 0.1 to 1.2 mm.

The substrate preferably has a function of recording or reproducing information. For example, the substrate itself may have, in a partial area or in an entire area of one surface or both surfaces thereof, concave and convex pits or guide grooves that correspond to address information or the like. The pits or guide grooves may have a pitch of about 0.3 to 1.6 μm and a depth of about 30 to 200 nm. The above function may be served by a recording and/or reproduction layer formed on the substrate. According to the present invention, the recording and/or reproduction layer has either one or both of a function of recording information and a function of reproducing information. If the so-called recording and/or reproduction layer is formed on the substrate, the recording and/or reproduction layer may comprise one or more layers to achieve writing and reading. Alternatively, the present invention may be constituted so that the substrate has concavities and convexities in a surface thereof and also one or more recording and/or reproduction layers are formed on the substrate. According to the present invention, the reproduction layer refers to a layer made of a magneto-optic recording film with a super-resolution effect for transferring, at the time of reproduction, signals that correspond to record-marks underlying that layer.

The recording and/or reproduction layer may usually be made of a material ordinarily used in the art. For example, in the case of a write-once medium, examples of the material include organic dye materials such as cyanine and phthalocyanine. In the case of a recordable, reproducible and erasable medium, examples of the material include magneto-optic recording materials (for example, a dielectric material such as SiN or the like, a recording film of a rare-earth transition metal alloy (e.g., TbFeCo), and a protective film of SiN or the like); phase change recording materials (for example, a dielectric material such as $ZnO.SiO_2$ or the like, a recording film of GeTeSb, AgInSb, AgInSbTe or the like, a protective film of $ZnS/SiO_2$ or the like); and the like. The thickness of the recording and/or reproduction layer is not particularly limited, but it is preferably, for example, about 5 to 500 nm. The recording and/or reproduction layer of any of those materials may be formed by a known method such as a sputtering method, an evaporation method, an EB method, a CVD method and a coating application method. In the case where the recording and/or reproduction layer is a layer for recording only, the recording and/or reproduction layer may be formed on the substrate, as a transparent intermediate layer with concavities and convexities that correspond to information. The transparent intermediate layer in this case may be made of the same material as used for the substrate. The thickness of the transparent intermediate layer may be adjusted properly according to: the kind or wavelength of light to be used; the material or thickness of the substrate or of a later-mentioned temperature-sensitive layer; or the like. The thickness of the transparent intermediate layer may be, for example, about 10 to 60 μm. The concavities and convexities may have the same pitch range as mentioned above.

In the case where the recording and/or reproduction layer is a write-once recording layer, it is suitable to adopt a layer structure of organic dye film/reflection film, and the like structure, as a structure of the recording and/or reproduction layer. In the case where the recording and/or reproduction layer is a magneto-optic recording layer, it is suitable to adopt a layer structure of dielectric film/magneto-optic film (rare-earth transition metal alloy film)/dielectric film/reflection film, and the like structure. In the case where the recording and/or reproduction layer is a phase change recording layer, it is suitable to adopt a layer structure of dielectric film/phase change film (AgInSbTe alloy film)/dielectric film/reflection film, and the like structure. Other than the above, a layer structure with an equivalent or similar function may be adopted.

The temperature-sensitive-layer of the present invention is a layer whose reflectance and/or transmittance can reversibly change according to a change in a temperature. In other words, it is a layer whose refractive index can change according to a change in a temperature of temperature-sensitive layer. The temperature-sensitive layer preferably has a light interference effect. As seen from FIG. 6, the light interference effect is an effect caused by light interference that varies with a temperature rise to change a light refrangibility, a reflectance and/or a transmittance.

The temperature-sensitive layer may be formed of:, for example, a single layer of a temperature-sensitive film; a laminated layer of a temperature-sensitive film and a reflection film; or the like. In the case where the temperature-sensitive layer is made of a laminated layer, the temperature-sensitive film and the reflection film may not necessarily be in direct contact with each other, and another layer may be interposed therebetween.

The temperature-sensitive film suitably contains, for example, a material whose reflectance and transmittance changes, and specifially, a material whose light transmittance changes by about 20 to 80% with a temperature change between about 20 and 200° C., preferably between about 20 and 180° C. For example, the transmittance of the temperature-sensitive film increases (a high transmittance state is produced) with a rise in the temperature of the temperature-sensitive film so as to allow incident light to pass through the temperature-sensitive film. In such a case, when there is a reflection film, incident light is reflected upon the reflection film so that a high reflectance state is produced. On the other hand, the transmittance of the temperature-sensitive layer decreases with a decline in the temperature of the temperature-sensitive layer. In such a case, when there is a reflection film, reflection of incident light upon the reflection film is inhibited so that a low reflective state is produced. The temperature-sensitive film may be specifically one that has a high transmittance state (high reflectance state) when the temperature thereof is within the range between 60° C. and 180° C. and a low transmittance state (low reflectance state) when the temperature thereof is within the range between 20° C. and 60° C. The temperature-sensitive film needs to have such a thickness that allows the temperature-sensitive film to exhibit a sufficient light interference effect. For example, the temperature-sensitive film may be one that has a substantial transparency and a thickness of, for example, about 5 to 900 nm, preferably a thickness of greater than about 40 nm, and more preferably a thickness of about 40 to 600 nm. The term "transparency" means having an about 50 to 100% light transmittance.

Specific examples of the material of the temperature-sensitive film include: inorganic thermochromic materials as metal oxides such as $SnO_2$, $CeO_2$, $NiO_2$, $ZnO$ and the like; and organic thermochromic materials such as lactone, fluoran and the like used in combination with alkali, and a leuco coloring matter used in combination with an organic acid. The thermochromic material is a substance whose chemical structure and refractive index change upon absorption of heat. The temperature-sensitive film of one of those materials may be formed by a known method such as a sputtering method, an evaporation method, an EB method, a coating application method and a sol-gel method.

The reflection film is formed on the substrate. In the case where the substrate has a function of recording or reproducing information using the concavities and convexities formed in the substrate itself, the reflection film is suitably formed either in close contact with the concavities and convexities formed in the surface of the substrate or on the later-mentioned temperature-sensitive film provided on the surface of the substrate having the concavities and convexities. In the case where one or more recording and/or reproduction layers are formed on the substrate, it is suitable that one reflection film be usually formed at a location farther from an incident light side than the recording layers. The reflection film is preferably made of a metal film with a high reflectance. Specific examples of the metal film include Al, Au, Ag and alloys thereof. A thickness of the reflection film is not specifically limited, and may be such a thickness that allows the reflection film to have a desired reflectance and may be, for example, 30 to 100 nm. The reflection film of one of those materials may be formed by a known method such as a sputtering method, an evaporation method, an EB method or the like.

In the optical information recording medium, the temperature-sensitive layer can be utilized as a light mask layer, as a reflection layer or as both a light mask layer and a reflection layer.

In the case where the temperature-sensitive layer is utilized as a light mask layer, it is suitable that the temperature-sensitive layer usually comprise one film formed at a location nearer to an incident light side than the recording and/or reproduction layer. More specifically, a temperature-sensitive film is formed on the substrate, and then the recording layer and the reflection film are formed in this order on the temperature-sensitive film. In the case where a plurality of recording and/or reproduction layers are formed on the substrate, there are formed a first temperature-sensitive film, a first recording film, one appropriate intermediate layer, a second temperature-sensitive film, a second recording film, another appropriate intermediate layer . . . an $n^{th}$ temperature-sensitive film and an $n^{th}$ recording film in this order on the substrate, and also, a reflection film is formed at a location farthest from an incident light side of all the recording films.

As a result, when no or only weak incident light is applied for reading or recording, a low transmittance state (bottom state of light interference effect) may be produced. On the other hand, when strong incident light is applied, a high transmittance state (peak state of light interference effect) may be produced due to an optical change or a thermal change in the temperature-sensitive film upon its temperature rise caused by absorption of light. Alternatively, a low transmittance state may be produced when strong incident light is applied and vice versa.

In the case where the temperature-sensitive layer is utilized as a reflection layer, it is suitable that the temperature-sensitive layer usually comprise one film formed at a location farther from an incident light side than the recording and/or reproduction layer. There are two types of media which have a function of recording or reproducing information using concavities and convexities formed in a substrate itself, namely, one medium where a surface of a substrate with concavities and convexities is located at a side far from an incident light side and there are formed either only a temperature-sensitive film or both a temperature-sensitive film and a reflection film in this order on the surface with the concavities and convexities, and the other medium where a surface of a substrate with concavities and convexities is located at a side near to an incident light side and there are formed either only a temperature-sensitive film or both a temperature-sensitive film and a reflection film in this order on the surface with the concavities and convexities. In the case where the recording and/or reproduction layer is formed on the substrate, first, the recording and/or reproduction layer is formed on the substrate and then, either only a temperature-sensitive film or both a temperature-sensitive film and a reflection film are formed on the recording and/or reproduction layer. As a result, when no or only weak incident light is applied for reading or recording, a bottom state of light interference effect with a low reflectance is produced, while when strong incident light is applied, a peak state of light interference effect with a high reflectance is produced due to an optical change or a thermal change in the temperature-sensitive film upon its temperature rise caused by absorption of light. More specifically, a rise in the temperature of the temperature-sensitive film by optical energy present at a central part in a reproduction light spot causes a change in a refractive index of the temperature-sensitive film, whereby the reflectance of the reflection film increases and, with a reproduction light wavelength, a peak state of light interference effect with a high reflectance is attained. On the other hand, the light reflectance at a peripheral part in the reproduction light spot, i.e., at a relatively low-temperature part, is kept low. In the case where a plurality of recording and/or reproduction layers are formed on the substrate, the temperature-sensitive film may be formed on one of the recording and/or reproduction layers at a location farthest from reproduction light and utilized as a reflection layer.

In the case where the temperature-sensitive layer is utilized as both a light mask layer and a reflection layer, the temperature-sensitive layer suitably comprises the two temperature-sensitive films formed respectively at locations nearer to and farther from an incident light side than the recording and/or reproduction layer. More specifically, one temperature-sensitive film, a recording layer, another temperature-sensitive film and a reflection film are formed in this order on the substrate. As a result, the temperature-sensitive layer functions as both a light mask layer and a reflection layer mentioned above and thereby serves to further improve reproduction and resolution. In the case where there are a plurality of recording and/or reproduction layers, the temperature-sensitive film may be formed on one of the recording and/or reproduction layers at a location farthest from reproduction light and utilized as a reflection layer.

According to the optical information recording medium of the invention, a protective film is preferably formed at a side far from an incident light side. The protective film may be made of any material as long as it can protect the recording and/or reproduction layer, the temperature-sensitive film and the like and as long as it can provide an appropriate strength to the optical information recording medium. Specific examples of the material of the protective layer include the same materials as used for the substrate. The protective layer may have transparency or no transparency. The protective layer preferably has a thickness of about 1 to 100 μm. Also, a heat insulating layer may be formed at an arbitrary location. The heat insulating layer may be made of, for example, ZnS, SiO$_2$, SiN, ZrO$_2$ or the like, and may have a thickness of, for example, about 5 to 100 nm.

As described above, the optical information recording medium of the present invention may be made of a substrate, a temperature-sensitive layer and optionally another layer in various combinations. Exemplary combinations when the optical information recording medium is viewed from an incident light side include:

substrate (with or without concavities and/or convexities)/temperature-sensitive film/protective layer;

substrate (with or without concavities and/or convexities)/temperature-sensitive film/reflection film/protective layer;

substrate (with or without concavities and/or convexities)/temperature-sensitive film/light absorption film/reflection film/protective layer;

substrate (with or without concavities and/or convexities)/temperature-sensitive film/light absorption film/heat insulating layer/reflection film/protective layer;

substrate (with or without concavities and/or convexities)/temperature-sensitive film/recording layer/protective layer;

protective layer/temperature-sensitive film/substrate (with or without concavities and/or convexities);

protective layer/temperature-sensitive film/reflection film/substrate (with or without concavities and/or convexities);

protective layer/temperature-sensitive film/light absorption film/reflection film/substrate (with or without concavities and/or convexities);

protective layer/temperature-sensitive film/light absorption film/heat insulating layer/reflection film/substrate (with or without concavities and/or convexities);

protective layer/temperature-sensitive film/recording layer/substrate (with or without concavities and/or convexities);

(pneumatic layer)/temperature-sensitive film/substrate (with or without concavities and/or convexities);

(pneumatic layer)/temperature-sensitive film/reflection film/substrate (with or without concavities and/or convexities);

(pneumatic layer)/temperature-sensitive film/light absorption film/reflection film/substrate (with or without concavities and/or convexities);

(pneumatic layer)/temperature-sensitive film/light absorption film/heat insulating layer/reflection film/substrate (with or without concavities and/or convexities);

(pneumatic layer)/temperature-sensitive film/recording layer/substrate (with or without concavities and/or convexities);

protective layer/temperature-sensitive film/intermediate layer (with or without concavities and/or convexities)/ . . . /temperature-sensitive film/substrate (with or without concavities and/or convexities);

(pneumatic layer)/temperature-sensitive film/intermediate layer (with or without concavities and/or convexities)/ . . . /temperature-sensitive film/substrate (with or without concavities and/or convexities);

protective layer/temperature-sensitive film/recording layer/intermediate layer (with or without concavities and/or convexities)/ . . . /temperature-sensitive film/recording layer/substrate (with or without concavities and/or convexities);

(pneumatic layer)/temperature-sensitive film/recording layer/intermediate layer (with or without concavities and/or convexities)/ . . . /temperature-sensitive film/recording layer/substrate (with or without concavities and/or convexities); and the like.

The term pneumatic layer is used to indicate a state that the temperature-sensitive film is exposed to the atmosphere.

With the above structures, the present invention can realize optical information recording media without a writable recording and/or reproduction layer such as a so-called CD, CD-ROM, DVD, DVD-ROM and the like, and optical information recording media with a writable recording and/or reproduction layer such as a so-called CD-R, CD-RW, DVD-R, DVD-RW, DVD-RAM, MO and the like, both types of media having either a single-layered recording/reproduction structure or a multi-layered recording/reproduction structure.

The optical information recording medium of the present invention may be not only in the form of a so-called optical disc but also in the form of a card or a sheet, and may be any of various optical information recording media such as a magneto-optical disc, a phase change type optical disc and the like.

Further, the optical information recording medium of the present invention may be constructed as a laminate of the above combinations in which substrates each having, for example, either a combination of a temperature-sensitive film and a metal reflection film or a combination of a temperature-sensitive film, a metal reflection film and a recording and/or reproduction layer thereon are joined together so that the temperature-sensitive films, the metal reflection films or the recording and/or reproduction layers are opposed to each other, in order to allow light irradiation from both substrate sides thereof. Further, the optical information recording medium of the present invention may be constructed as a hybrid medium having both a surface for reproduction only and a surface for recording and reproduction.

Unlike conventional media that reduce the diameter of a beam spot by changing light transmittance with use of a light mask provided at a light incident side, the optical information recording medium of the present invention utilizes a very useful super resolution reproduction system that can make a great difference between a peak and a bottom of light interference effect with respect to transmittance.

Hereafter, there will be explained in detail embodiments of the optical information recording medium of the present invention.

Embodiment 1

Referring to, for example, FIG. 1, an optical information recording medium according to the present invention is illustrated as an optical information recording medium 10 for exclusive use in reproduction that comprises a transparent substrate 12, a temperature-sensitive film 13, a reflection film 14 and a protective layer 15 formed in this order from a side from which light 11 is incident.

The transparent substrate 11 is made of, for example, polycarbonate having a thickness of about 0.6 mm, and has information pits or guide grooves in one surface (an internal side surface) thereof. The temperature-sensitive film 13 is made of CeO$_2$ having a thickness of about 860 nm. The reflection film 14 is made of Al having a thickness of about 100 nm.

The above optical information recording medium may be produced by, for example, the following process.

First, on the transparent substrate 12 having the information pits or the guide grooves in the surface (information-recorded surface), there are sequentially formed the temperature-sensitive film 13 and the metal reflection film 14 by a magnetron sputtering method.

Finally, in order to protect the information-recorded surface, the temperature sensitive film 13 and the like from an external environment, an ultraviolet-curing type acrylic resin is spin-coated and cured by irradiation with ultraviolet light to form the protective layer 15.

According to the present optical information recording medium for reproduction only, reproduction light (a laser beam) is guided from the substrate side into the information pits or the guide grooves in the substrate 12 at the time of reproduction and then, reflection light thus obtained is used as a reproduction signal.

Figure 6:
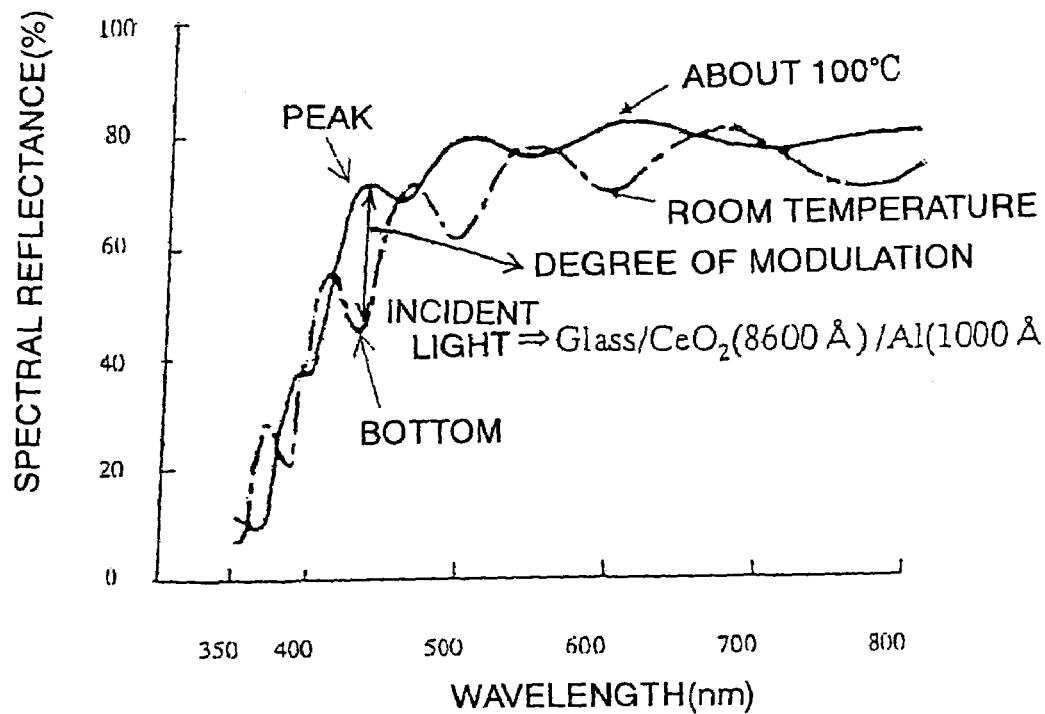
FIG. 6 is a view illustrating a spectral reflectance characteristic of a temperature-sensitive layer having a light interference effect in another example of the optical information recording medium of the present invention.
Figure 7:
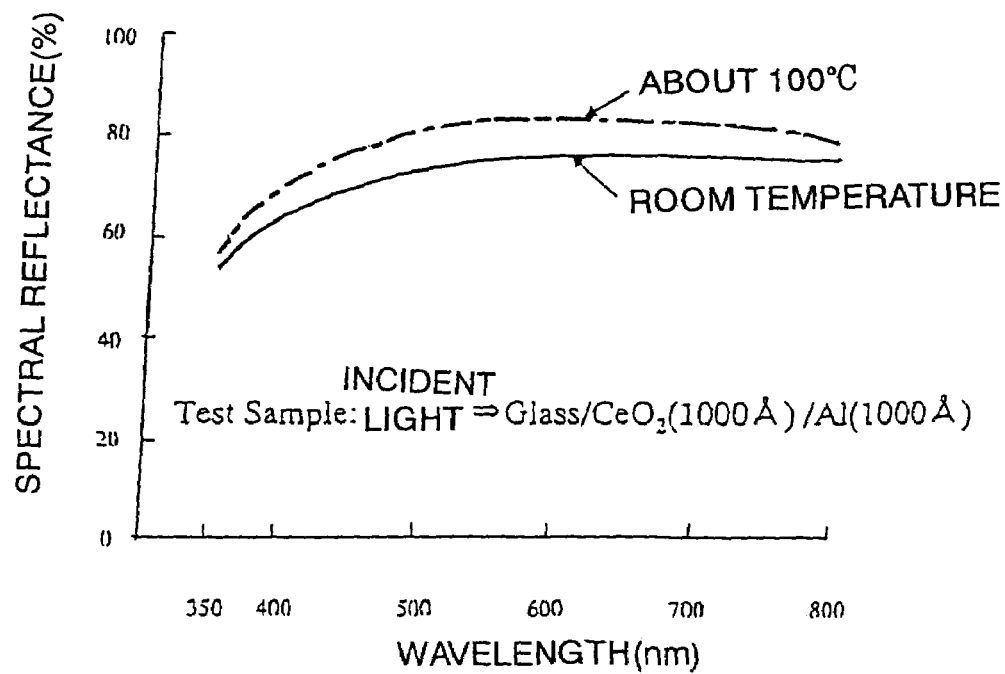
FIG. 7 is a view illustrating a spectral reflectance characteristic of a temperature-sensitive layer in a conventional optical information recording medium.

For example, when reproduction light (442 nm) is allowed to enter from the substrate side, as shown in FIG. 6, the light transmittance increases only at a part of the temperature-sensitive film at which the entrance of the light has caused a temperature rise, i.e., at a central part in a spot of the reproduction light at which the light energy intensity is strong and thus a peak state of light interference effect is produced. The light is reflected upon the metal reflection film on the rear side of the medium, and thereby the temperature-sensitive film having the light interference effect is brought into a high-reflectance state. The light transmittance at a peripheral part in the light spot, i.e., a part at which the temperature is relatively low, remains low (in a bottom state of light interference). Thus, the reproduction light is transmitted through the temperature-sensitive film only at the central part in the light spot and hardly transmitted at the peripheral part therein to result in substantial no reflection of the reproduction light even upon the metal reflection film on the rear side. The temperature-sensitive film having the light interference effect is brought into a low-reflectance state.

As the temperature decreases, the transmittance declines, so that the reflection upon the metal reflection film on the rear side is inhibited, and the temperature-sensitive film having the light interference effect is brought into a low-reflectance state.

As described above, by reducing the size of a reproduction beam spot, information on the surface of the substrate with the information pits (information surface) can be reproduced with high reliability as a reproduction signal having greater intensity.

Embodiment 2

Figure 2:
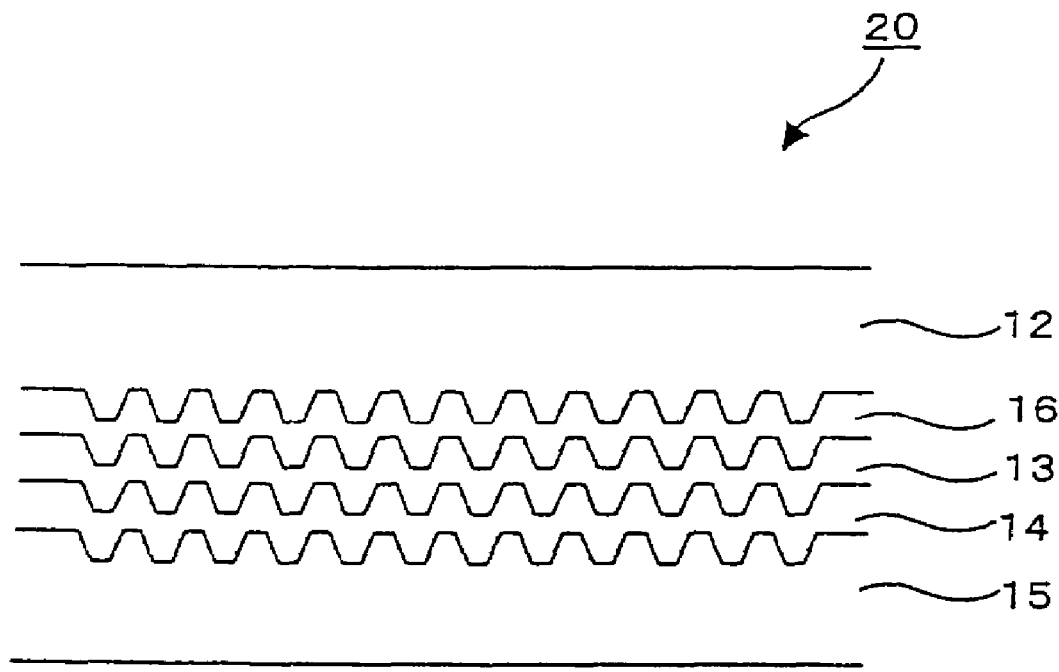
FIG. 2 is a schematic cross section of an essential part in another example of the optical information recording medium of the present invention.

As shown in FIG. 2, an optical information recording medium 20 for recording and reproduction comprises the transparent substrate 12, a recording and/or reproduction layer 16, the temperature-sensitive film 13, the reflection film 14 and the protective film 15 formed in this order when viewed from the light incident side. The recording and/or reproduction layer 16 has a laminated structure of, for example, a dielectric film of SiN, a recording film of TbFeCo and a protective film of SiN.

In such an optical information recording medium as described above, since the temperature-sensitive film is provided on the rear surface of the recording layer when viewed from the light incident side, reproduction light (a laser beam) is guided into the guide groove of the transparent substrate, then passes through the recording layer, and enters the temperature-sensitive film at the time of reproduction. As described above, the entrance of the light causes a decline in a refractive index of the temperature-sensitive film and a rise in a reflectance thereof. With a given wavelength of the reproduction light, the reflectance reaches its peak because of the light interference effect. Outside the reproduction light, on the other hand, the refractive index of the temperature-sensitive film becomes greater and the reflectance is kept low. As a result, the metal reflective film on the rear side reflects with a great intensity a reproduction signal according to information recorded in the recording layer, so that a stronger reproduction signal can be obtained.

Embodiment 3

Figure 3:
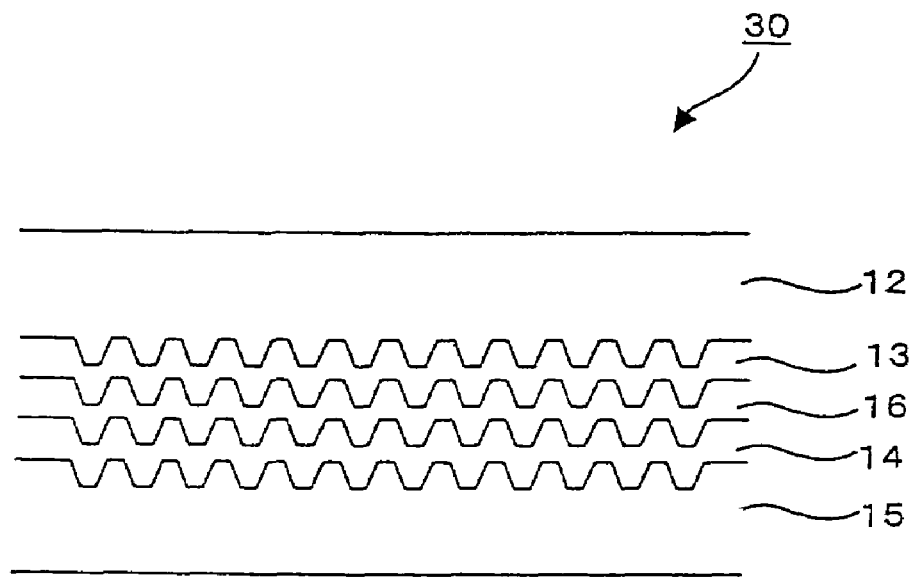
FIG. 3 is a schematic cross section of an essential part in another example of the optical information recording medium of the present invention.

As shown in FIG. 3, an optical information recording medium 30 for recording and reproduction is substantially the same as the optical information recording medium according to Embodiment 2 except that the locations of the recording and/or reproduction layer 16 and the temperature-sensitive film 13 are exchanged.

In such an optical information recording medium, at the time of reproduction, a powerful reproduction signal can be obtained substantially as with the above case. On the other hand, at the time of recording, for example, the recording layer is heated via the temperature-sensitive film by irradiation with a higher level of laser power than at the time of reproduction so that information can be recorded in the recording layer.

Embodiment 4

Figure 4:
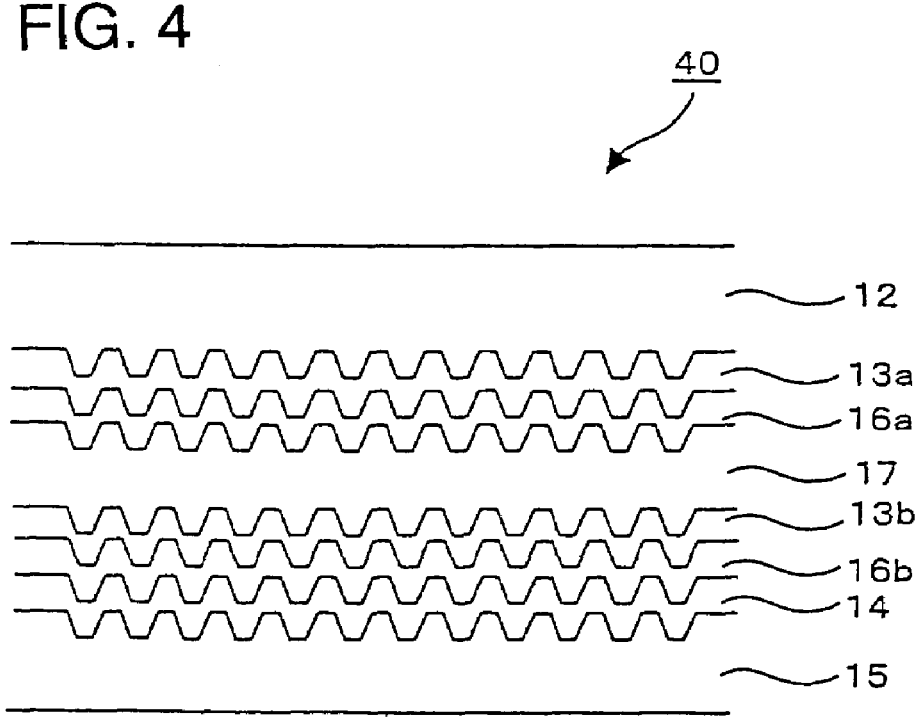
FIG. 4 is a schematic cross section of an essential part in another example of the optical information recording medium of the present invention.
Figure 5:
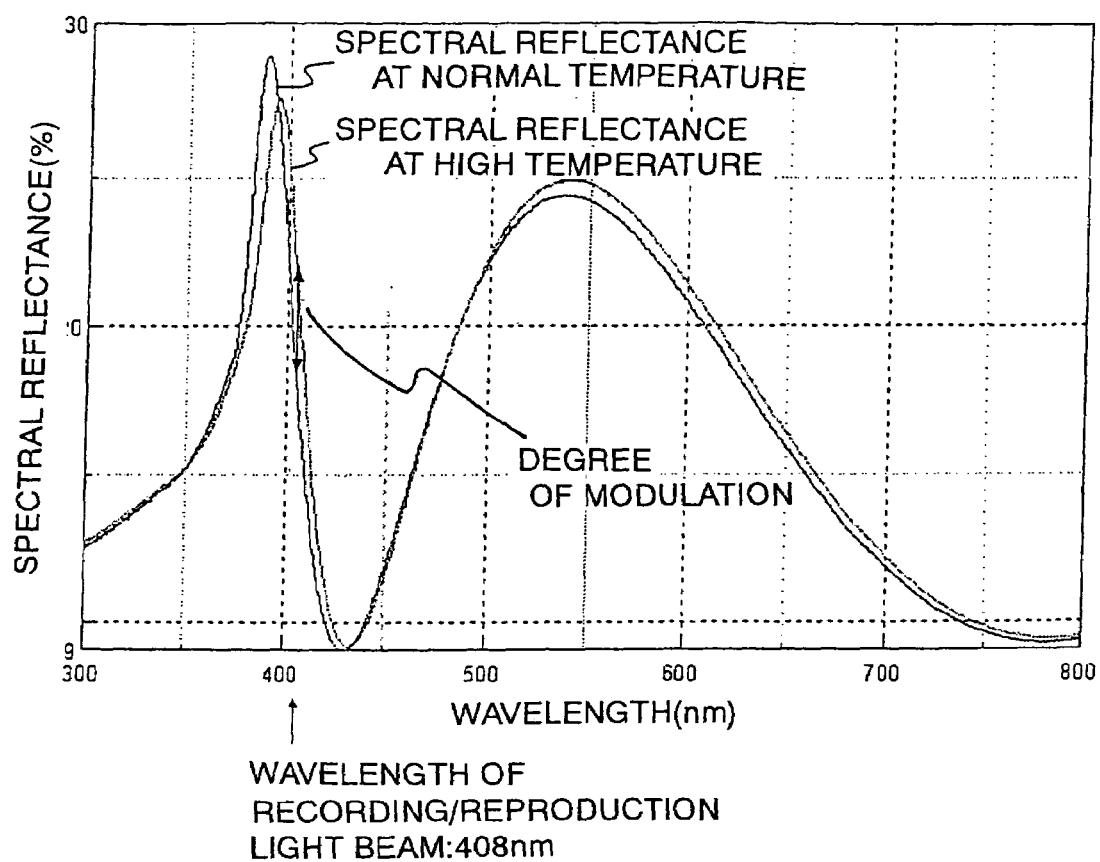
FIG. 5 is a view illustrating a spectral reflectance characteristic of a temperature-sensitive layer in one example of the optical information recording medium of the present invention.

As shown in FIG. 4, an optical information recording medium 40 for recording and reproduction comprises the transparent substrate 12, one temperature-sensitive film 13a, one recording and/or reproduction layer 16a, a transparent intermediate layer 17, another temperature-sensitive film 13b, another recording and/or reproduction layer 16b, the reflection film 14 and the protective film 15 formed in this order from the light incident side. The transparent intermediate layer is made of the same material as used for the transparent substrate 12 and the protective layer 15, and has a thickness of about 30 μm.

Embodiment 5

An optical information recording medium according to this embodiment includes, as a temperature-sensitive film, a ZnO film with a thickness of 215 nm formed on the transparent substrate.

When the optical information recording medium is irradiated with light having a wavelength of 408 nm, it has a reflectance as low as 19% at ordinary temperature while having a reflectance as high as 22% at a high temperature of 200° C. This allows only a high temperature portion of a recording/reproduction light beam to serve as an effective beam, and thereby allows recording/reproduction to be performed with a beam of a diameter smaller than that of the original one. Consequently, recording/reproduction of very small marks beyond a diffraction limit of light beam can be achieved.

According to the present invention, since there is formed on the substrate the temperature-sensitive layer whose reflectance and/or transmittance reversibly changes according to a temperature change, the reflectance rises or declines at the central part at which the temperature rises due to concentration of irradiation light, and the reflectance remains low or high at the peripheral part at which the temperature is low. Also, in the case where the temperature-sensitive layer is arranged at a side near to a light incident side, the transmittance rises or declines at the central part at which the temperature rises due to concentration of irradiation light, and the transmittance remains low or high at the peripheral part at which the temperature is low. Owing to these effects, only information at the central part smaller in diameter than a spot of the irradiation light can be reproduced reliably, accurately and effectively. Consequently, the present invention can provide a highly reliable optical information recording medium.

In the case where the recording layer is further formed, especially between the temperature-sensitive as a reflection layer and the substrate, information recorded in the recording layer can also be reproduced reliably and accurately as with the above case.

Further, according to the present invention, a high signal quality can be ensured so that reproduction with high stability can be performed.

The invention claimed is:

1. An optical information recording medium characterized in that a temperature-sensitive film of $CeO_2$ or ZnO and a reflection film are formed in that order on a side of a substrate having information recorded therein by means of concavities and convexities that is opposite to a reproduction light incident side of said substrate.

2. An optical information recording medium characterized in that a temperature sensitive film of $CeO_2$ or ZnO, an organic dye film for recording information and a reflection film are formed in that order on a side of a substrate opposite to a reproduction light incident side of said substrate.

3. An optical information recording medium characterized in that a temperature sensitive film of $CeO_2$ or ZnO, a dielectric film, a magneto-optic film for recording information, a dielectric film and a reflection film are formed in that order on a side of a substrate opposite to a reproduction light incident side of said substrate.

4. An optical information recording medium characterized in that a temperature sensitive film of $CeO_2$ or ZnO, a dielectric film, a phase change film for recording information, a dielectric film and a reflection film are formed in that order on a side of a substrate opposite to a reproduction light incident side of said substrate.

5. An optical information recording medium as recited in claim 1, wherein the temperature-sensitive film has a thickness of 5 to 900 nm.

6. An optical information recording medium as recited in claim 2, wherein the temperature-sensitive film has a thickness of 5 to 900 nm.

7. An optical information recording medium as recited in claim 3, wherein the temperature-sensitive film has a thickness of 5 to 900 nm.

8. An optical information recording medium as recited in claim 4, wherein the temperature-sensitive film has a thickness of 5 to 900 nm.

9. An optical information recording medium as recited in any one of claims 1 to 8, wherein the temperature sensitive film comprises two or more layers and the respective layers of the temperature sensitive film are respectively separated from one another by an intermediate layer.

10. An optical information recording medium as recited in claim 9, wherein the temperature-sensitive film has a thickness of 5 to 900 nm.

11. A reproduction method of an optical information recording medium characterized in that the method comprises the steps of:
   providing an optical information recording medium according to any one of claims 1-8;
   irradiating the provided optical information recording medium with a light beam to form a spot of the light beam on a temperature sensitive layer so that a high-temperature region and a low temperature region are generated;
   reversibly changing reflectance and/or transmittance of the high-temperature and the low-temperature regions of the temperature sensitive layer; and
   reproducing information according to light reflected from the temperature region having the higher reflectance.

12. A reproduction method of an optical information recording medium characterized in that the method comprises the steps of:
   providing an optical information recording medium according to any one of claims 1-8 wherein the temperature-sensitive film of said optical information recording medium comprises two or more layers and the respective layers of the temperature-sensitive film are separated from one another by intermediate layers;
   irradiating the provided optical information recording medium with a light beam to form a spot of the light beam on a temperature sensitive layer so that a high-temperature region and a low temperature region are generated;
   reversibly changing reflectance and/or transmittance of the high-temperature and the low-temperature regions of the temperature sensitive layer; and
   reproducing information according to light reflected from the temperature region having the higher reflectance.

13. An optical information recording medium as recited in claim 12, wherein the temperature-sensitive film has a thickness of 5 to 900 nm.

* * * * *